United States Patent
Breitkopf et al.

(10) Patent No.: US 9,846,263 B2
(45) Date of Patent: Dec. 19, 2017

(54) METAL OXIDE DISPERSION AND USES THEREOF

(71) Applicant: Novartis AG, Basel (CH)

(72) Inventors: Richard Charles Breitkopf, Dunwoody, GA (US); Rahul Panicker, Larchmont, NY (US)

(73) Assignee: Novartis AG, Basel (CH)

( * ) Notice: Subject to any disclaimer, the term of this patent is extended or adjusted under 35 U.S.C. 154(b) by 203 days.

(21) Appl. No.: 14/539,280

(22) Filed: Nov. 12, 2014

(65) Prior Publication Data

US 2015/0144850 A1 May 28, 2015

Related U.S. Application Data

(60) Provisional application No. 61/908,773, filed on Nov. 26, 2013.

(51) Int. Cl.
| | |
|---|---|
| *G02B 1/10* | (2015.01) |
| *C09D 11/326* | (2014.01) |
| *C09D 17/00* | (2006.01) |
| *B29D 11/00* | (2006.01) |

(52) U.S. Cl.
CPC .......... *G02B 1/10* (2013.01); *B29D 11/00894* (2013.01); *C09D 11/326* (2013.01); *C09D 17/007* (2013.01)

(58) Field of Classification Search
CPC .......... G02B 1/10; G02C 7/046; G02C 7/049; C09D 11/326; C09D 17/007; B29D 11/00894
USPC ....... 106/31.13, 460; 252/586; 524/274, 847
See application file for complete search history.

(56) References Cited

U.S. PATENT DOCUMENTS

| | | | | |
|---|---|---|---|---|
| 4,668,240 A | | 5/1987 | Loshaek | |
| 5,436,345 A | * | 7/1995 | Lewis | C07D 211/94 546/290 |
| 7,901,501 B2 | * | 3/2011 | Kobayashi | B82Y 30/00 106/31.65 |
| 2004/0152798 A1 | | 8/2004 | Weissman | |
| 2005/0004288 A1 | * | 1/2005 | Koyanagi | C08F 283/10 524/274 |
| 2007/0191509 A1 | | 8/2007 | Kobayashi | |
| 2011/0245391 A1 | | 10/2011 | Karpov | |
| 2012/0165430 A1 | * | 6/2012 | Donaldson | C09D 5/02 523/400 |
| 2013/0164529 A1 | * | 6/2013 | Yu | C09C 1/0036 428/363 |
| 2013/0284050 A1 | * | 10/2013 | Adamic | C09D 11/322 106/31.13 |
| 2013/0331474 A1 | | 12/2013 | Kida | |

FOREIGN PATENT DOCUMENTS

| | | |
|---|---|---|
| EP | 1818373 A2 | 8/2007 |
| JP | 2004-059857 A | 2/2004 |
| WO | 0216514 A1 | 2/2002 |
| WO | 02/088192 A1 | 11/2002 |
| WO | 03040242 A2 | 5/2003 |
| WO | 2007052687 A1 | 5/2007 |

OTHER PUBLICATIONS

PCT International Search Report dated Feb. 5, 2015, International Application No. PCT/US2014/065196, International Filing Date Nov. 12, 2014.

PCT Written Opinion of the International Searching Authority dated Feb. 5, 2015, International Application No. PCT/US2014/065196, International Filing Date Nov. 12, 2014.

\* cited by examiner

*Primary Examiner* — Bijan Ahvazi
(74) *Attorney, Agent, or Firm* — Sheng-Hsin Hu

(57) ABSTRACT

The present invention provides a metal oxide dispersion comprises a metal oxide, a millbase and a dispersant. The dispersant in the metal oxide is selected from a group consisting of a phosphoric acid polyester copolymer, a trimethoxysilane compound, a triethoxysilanes compound, dimethylamino ethyl methacrylate (DMAEMA) and a combination thereof, and the dispersion is substantially free of water. The metal oxide dispersion of the invention is useful for manufacturing an inkjet ink to provide a high-quality color image on a contact lens or a mold so as to produce a colored contact lens.

12 Claims, No Drawings

METAL OXIDE DISPERSION AND USES THEREOF

This application claims the benefit under 35 USC §119 (e) of U.S. provisional application No. 61/908,773 filed Nov. 26, 2013, incorporated by reference in its entirety.

The present invention relates to a metal oxide dispersion for making ink jet color ink. The ink can be applied by inkjet printing systems to contact lenses or to the molds that will be used to make contact lenses. In the latter case, the ink printed on the mold surface would be incorporated into the contact lens as constituent monomers of contact lens are then added to the mold and polymerized. The ink contains both pigment delivering color and said monomers to incorporate into the lens. In either case, the resultant product will be a contact lens to which colored ink has been applied.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation/toric marks, inversion marks, product/brand codes, lot numbers, "DEMO" lenses, and the like, which are of benefits to wearers, eye-care practitioners and manufacturers.

Presently, methods of printing inks onto contact lenses involve cliché ink transfer pad printing. A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts the contact lens.

There are several disadvantages associated with using pad printing to color contact lenses. First, the method lacks consistency and slight differences in the silicone pad can cause wide variation in image quality, effecting dot resolution and color reproducibility. Further, multiple color layering is difficult and time consuming. Further still, the design and printing process using this method is slow. After an image is fully designed, it can take about two weeks before that image is etched onto a cliché. The set-up is painstakingly detailed and lengthy when more than one color is printed on the lens using this method. Lastly, for use in the light stream (glass mold) technology directly contacting the surfaces in selected areas with a silicone pad introduces the potential for oil deposition on the surface and mold release problems. The inconsistency, slow speed of this printing method inhibits business strategies, making it difficult to offer consumers a choice of lens designs at the point of purchase.

Ink-jet printing may be used to replace the above-mentioned method for printing colored images with high quality on a contact lens. However, inkjet inks known in the art are not suitable for printing colored images on a contact lens because they may not meet some basic requirements, such as high opacity without leaching of any harmful residuals, rub-resistance, smoothness, and health safety. Furthermore, inkjet inks are sometimes smeared, streaked, smudged on the contact lens. Many metal oxides are contained in many inkjet inks to provide proper lightness and hue of many inks. The metal oxides are relatively high density and tend to aggregate and form agglomerates that precipitate out of the ink compositions. In addition, iron oxide and titanium dioxide are more difficult to grind to small particles and their suspensions can be less stable. Iron oxides have both electrostatic and magnetic forces contributing to agglomeration while titanium dioxide is a dense, refractive pigment with a hydrophilic surface which is difficult to disperse in a hydrophobic millbase. Consequently, it is difficult to formulate ink compositions containing metal oxide, particularly iron oxide and titanium dioxide that are suitable for use in ink jet printing. It is especially important to be able to incorporate titanium and iron oxides into these inks because these are FDA approved for use in contact lenses and any new, more easily dispersible colorants must go through a lengthy petition process with the agency before they may be used.

Therefore, there are needs for metal oxide dispersion suitable for formulating ink jet inks for printing a high-quality color image on a contact lens without smudging problems using an inkjet printing system. There are also needs for methods for making such metal oxide dispersions.

SUMMARY OF THE INVENTION

The present invention provides a metal oxide dispersion composition comprising a metal oxide, a dispersant and a millbase, wherein the dispersant is selected from a group consisting of a phosphoric acid polyester copolymer, a trimethoxysilane compound, a triethoxysilanes compound, dimethylamino ethyl methacrylate (DMAEMA) and a combination thereof, wherein the dispersion is substantially free of water.

DETAILED DESCRIPTION OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are well known and commonly employed in the art. As employed throughout the disclosure, the following terms, unless otherwise indicated, shall be understood to have the following meanings:

Millbase: the main liquid in which a pigment is dispersed, typically using milling methods Dispersant: a compound that acts to chemically stabilize the surface of a pigment so as to prevent agglomeration.

Dispersion: the ensemble of pigment, millbase, dispersant and any other components.

The present invention is related more specifically to a metal oxide dispersion for making various ink jet color ink. The ink jet color ink can be used for printing of a color image on an ophthalmic lens, preferably a contact lens, or a mold for making a contact lens.

The present invention is partly based on the discovery that in a titanium dioxide dispersion of the invention, phosphoric acid polyester copolymer dispersant can improve the metal oxide dispersibility. The phosphoric acid polyester copolymer dispersant prevents the titanium dioxide particles from agglomerating into larger structures. According to the present invention, it is surprising to discover that polycaprolactone-polyacid dispersant does not prevent the titanium dioxide particles from agglomerating into big particle size as effectively as phosphoric acid polyester copolymer dispersant. The present invention is also partly based on the discovery that a phosphoric acid polyester copolymer with acidic groups dispersant that can be utilized for the titanium dioxide particles dispersion has an acid value of from about 70 mg KOH/g to about 240 mg KOH/g, preferred from about 90 mg KOH/g to about 190 mg KOH/g, more preferred from about 110 mg KOH/g to about 130 mg KOH/g.

Without a good pigment dispersion with a small enough particle size and surface stabilized particles to prevent agglomeration, ink jet printing cannot be realized for making silicone hydrogel color contact lenses.

The metal oxide dispersion of the present invention typically comprises a metal oxide, a dispersant, and a millbase and the metal oxide dispersion is substantially free of water.

"Substantially free of water" as that term is used herein means water content is less than 4%, preferred less than 2%, more preferred less than 1%, most preferred less than 0.5%.

"Metal oxide" as that term is used herein means titanium dioxide, iron oxide or mixtures of titanium dioxide and iron oxide.

The present invention is also partly based on the discovery that in any ink containing pigment dispersions described in this invention, a thixotropic additive such as a silicon dioxide can prevent inkjet inks from smudging once printed on mold. The ink matrix once printed on the mold can undergo smudging or running of pigment in the face of exposure to lens formulation and mold closure, which can forcibly remove ink material. The addition of silicon dioxide helps prevent ink smudging by stiffening the printed ink after printing. Silicon dioxide, which acts as a thixotropic agent in the ink provides additional stiffness to the cured ink on the mold. When lens formulation comes in contact with the cured dot, the extra stiffness provided by the silicon dioxide helps prevent smudging and smearing of the print. Silicon dioxide can be added to ink containing pigment dispersions as Silicon dioxide or Silicon dioxide dispersion.

Titanium dioxide is found in the crystalline forms of anatase type, rutile type and brookite type. The anatase type has a relatively low density and is easily ground into fine particles, while the rutile type has a relatively high refractive index, exhibiting greater hiding power. Either one of these is usable in preferred embodiments of the invention.

Iron oxides are chemical compounds composed of iron and oxygen. Altogether, there are sixteen known iron oxides and oxyhydroxides. Iron oxides and oxide-hydroxides are widespread in nature, play an important role in many geological and biological processes, and are widely utilized by humans, e.g., as iron ores, pigments, catalysts, in thermite. Common rust is a form of iron (III) oxide. Iron oxides are widely used as inexpensive, durable pigments in paints, coatings and colored concretes. Colors commonly available are in the "earthy" end of the yellow/orange/red/brown/black range. According to this invention, Iron oxides include iron (II) oxide (FeO), iron (II, III) oxide ($Fe_3O_4$), and iron (iii) oxide hydrate ($Fe_2O_3$-$xH_2O$) where x is a positive integer and iron (III) oxide ($Fe_2O_3$). The iron(III) oxide (Fe2O3) includes alpha phase, hematite ($\alpha$-$Fe_2O_3$), beta phase, ($\beta$-$Fe_2O_3$), gamma phase, magnetite ($\gamma$-$Fe_2O_3$) and epsilon phase, and ($\epsilon$-$Fe_2O_3$). The iron oxide hydrate is typically a yellow colorant (CI pigment yellow 42 and 43).

According to the present invention, metal oxide includes titanium dioxide, and iron oxides. Iron oxides include red iron oxide, black iron oxide, yellow iron oxide and brown iron oxide, and chromium oxide green; carbon black; bismuth vanadate; ferric ferrocyanide (Prussian blue); ultramarine; lead chromate.

According to the present invention, the numeric average particle diameter of the metal dispersion is preferably not greater than 500 nm, more preferably is not greater than 100 nm, still more preferably is not greater than 50 nm, and most preferably at is not greater than 30 nm. The numeric average metal oxide particle diameter of dispersion can be determined as is well known to those of skill in the art. One exemplary method of determining the numeric average particle diameter of the metal oxide dispersion includes use of a Diffraction Particle Size Analyzer, such as a LA-920 Laser Scattering Particle Size Distribution Analyzer (Horiba Instruments, Inc., Irvine, Calif.). Another exemplary method of determining the numeric average particle diameter of the metal oxide dispersion includes use of a Zetasizer Nano ZS (Malvern Instruments, Worcestershire, UK) analyzer.

A dispersion as disclosed herein includes at least one dispersant. A dispersant generally creates an interface layer that can render the particle and the medium (solvent and/or monomer/polymer) compatible to prevent the particles from agglomerating. Dispersants generally contain at least two different kinds of groups, one which associates with one component and one which provides repulsion between particles. Dispersants that can be utilized in dispersions as disclosed herein include a phosphoric acid polyester copolymer and polycaprolactone-polyacid copolymers or a monomeric dispersant for example, a dimethylamino ethyl methacrylate (DMAEMA).

According to the present invention, while any suitable dispersants can be employed, examples of suitable dispersants comprise at least one member selected from the group consisting of a phosphoric acid polyester copolymer, a trimethoxysilane compound, a triethoxysilanes compound and a combination thereof. Suitable dispersants also include monomeric dispersants with pigment affinity groups such as amines or phosphates, for example, dimethylamino ethyl methacrylate (DMAEMA).

According to the present invention, for iron oxide dispersions, preferred dispersant components are organosilanes. More preferred are trimethoxysilane compound including but not limited to: methacryloxypropyl trimethoxysilane, octadecyl trimethoxysilane, octadecyltriethoxysilane. The most preferred compound is methacryloxypropyl trimethoxysilane.

According to the present invention, for titanium oxide dispersion, preferred dispersant components are any acid dispersants. More preferred are copolymers comprised of polyester and phosphoric acid functionality are used. Solsperse 36000 is a polycaprolactone-polyacid copolymeric dispersant. Its molecular weight is greater than 10000 and its acid functionality value is 45 mg KOH/g. Disperbyk 111 is a co-polymer consisting of a polyester backbone and polyphosphoric acid. Its acid functionality is about 129 mg KOH/g. Most preferred dispersants are a phosphoric acid polyester copolymer with acidic groups, for example Disperbyk-111 (polymer dispersant manufactured by Byk Chemie).

For the millbase, a mono or di-acrylate or methacrylate compound may be used. Preferably, this compound should be hydrophobic and with good thermal stability to avoid polymerization during milling. For the most preferred embodiment, dipropylene glycol diacrylate (DPGDA) is used.

In dispersions that include phosphoric acid polyester copolymer with acidic groups dispersants, the acid value can be used to more specifically describe phosphoric acid polyester copolymer that can be utilized. The acid value is the amount of base that is needed to titrate the acidic groups of the dispersant, and is a measure of the acid concentration in a dispersant. A higher acid value (AV) number implies that more base is necessary to titrate the acidic groups on the dispersant and therefore the dispersant is strongly basic; and conversely, a lower AV number implies that less base was necessary to titrate the acidic groups on the dispersant and therefore the dispersant is weakly acidic.

One method of evaluating the acid value (AV) of a dispersant is as follows. First the factor of an alcoholic potassium hydroxide (KOH) solution must be determined by titrating a 25.0 ml of 0.1 M hydrochloric acid with the alcoholic potassium hydroxide solution (50 parts (by volume) toluene (AR grade), 25 parts (by volume) ethanol 64OP (AR grade), and 25 parts (by volume) n-butanol (AR grade)) using phenolphthalein as an indicator. The factor of the alcoholic KOH is given as follows:

$$(25.0 \times F)/\text{Titre} = \text{KOH Factor}$$

Where F is the Factor of 0.1 M hydrochloric acid. The sample solution is prepared by accurately weighing from 4.0 to 5.0 g of the sample into a dry 250 ml conical flask and dissolve it in 100 ml of mixed solvent (50 parts (by volume) toluene (AR grade), 25 parts (by volume) ethanol 64OP (AR grade), and 25 parts (by volume) n-butanol (AR grade)) that has been previously neutralized to phenolphthalein with 0.1 M alcoholic KOH. The solution is then titrated with 0.1 M alcoholic KOH using phenolphthalein as an indicator. The acid value of the sample is then calculated by:

$$(\text{Titre} \times \text{KOH factor} \times 5.61)/\text{Weight of sample} = \text{Acid Value as mg KOH/g}$$

According to the present invention, a phosphoric acid polyester copolymer with acidic groups dispersant that can be utilized for titanium dioxide particles dispersion has an acid value of from about 70 mg KOH/g to about 240 mg KOH/g, an acid value of from about 70 mg KOH/g to about 240 mg KOH/g, preferred from about 90 mg KOH/g to about 190 mg KOH/g, more preferred from about 110 mg KOH/g to about 130 mg KOH/g.

According to the present invention, a millbase is a monomer and it is selected based on good thermal stability. A monomer is chosen because the ink must be UV cureable, but there must be sufficient thermal stability during the pigment milling process such that no polymerization can occur. According to the present invention, a millbase can be a difunctional acrylate monomer or a monofunctional acrylate. A millbase in the metal oxide dispersion of the invention can also be a mixture of a difunctional acrylate monomer or a monofunctional acrylate. The prefer millbase in the metal oxide dispersion of the invention is a difunctional acrylic monomer. The dispersant in the metal oxide dispersion of the invention can be organosilanes. The dispersion is substantially water free. Substantially water free means less than 5% water, preferably less than 1%, and most preferably less than 0.1% of water as expressed by weight of the total dispersion composition. Examples of the monofunctional acrylates that may be used include long chain aliphatic acrylates e.g. in the aliphatic group contains at least 8, preferably at least 10 carbon atoms, such as lauryl acrylate and stearyl acrylate, and acrylates of alkoxylated alcohols e.g. 2-(2-ethoxyethoxy) ethyl acrylate. Examples of diacrylates are the diacrylates of 1,4-butanediol, neopentylglycol, propoxylated neopentyl glycol, diethylene glycol, hexanediol, dipropylene glycol, tripropylene glycol, triethylene glycol and polyethylene glycols.

According to the present invention, for metal oxide dispersion, preferred millbase components are diacrylates of glycols and polyglycols, more preferred propylene glycol and polypropylene glycols e.g. di-, tri- and higher propylene glycols. The most preferred is dipropylene glycol diacrylate.

In one embodiment of the invention, a nominal dispersion contains from 20 to 70% by weight particulate metal oxide based on the total weight of the dispersion. Preferably, the particulate metal oxide is not less than 25% by weight and especially not less than 35% by weight of the mill-base.

The amount of millbase in the dispersion can vary over wide limits but is preferably not less than 10 w/w %, and more preferably not less than 25 w/w %, especially not less than 35 w/w % by weight of the of the mill-base.

The amount of dispersant in the mill-base is dependent on the amount of expected surface area of the particulate metal oxide but is preferably from 0.2 to 5 w/w % by weight of the dispersion.

Typically, the nominal dispersion can be further diluted with millbase liquid to a concentration range from a 0.5 w/w % to a 20 w/w % before incorporating into inkjet ink formulation. The dispersion can also be added directly to other ink components in the proper amount without an intermediate dilution step.

The silicon dioxide is typically added at 0.5-1% w/w in the final ink. Using this amount of silicon dioxide stiffens the printed features thereby making them less susceptible to smudging when it comes in contact with lens formulation.

The addition of silicon dioxide at the high end of this range can make final filtration of the ink difficult due to its thixotropic nature. However, when the silicon dioxide dispersion is processed with radical inhibitor, these problems are alleviated and product yields are improved.

Nearly any metal oxide can be used in the present invention, so long as it can be used in an inkjet printing system. Metal oxide(s) should be much smaller than a nozzle of a printer head to prevent clogging during the printing process. Generally, this means that preferred metal oxide are 3 microns or smaller. More preferably, a metal oxide is less than one micron. Larger metal oxides can be ground into smaller particles to reduce potential clogging. Preferred methods of reducing a metal oxide's particle size include high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

According to the present invention, a metal oxide dispersion is formed by initially mixing metal oxide particles with at least one other component of the dispersion and then dispersing the mixture by high shear force or attrition. Those skilled in the art will understand that the mixing and dispersing step can be carried out in one step or in multiple steps. The resultant dispersion has a numeric average particle diameter that is in the submicron range, as discussed above.

The initial mixing step can be accomplished using any method known to those of skill in the art, including but not limited to, the use of a mixing device. The function of the initial mixing step is to create a composition that is flowable on a large scale and to wet the pigment particles with millbase and dispersant for further processing.

After the optional initial mixing of the metal oxide particles with at least one other component of the dispersion, the mixture is dispersed. Generally, the function of the dispersing step is to form a dispersion, including a majority of metal oxide particles with a submicron diameter. Any method that can produce such a composition from the starting materials can be utilized herein. Generally, dispersions containing metal oxide particles with diameters of less than 50 nm can be used to form solutions that have a majority of metal oxide particles sizes that are greater than submicron. The dispersion step can be accomplished using any method known to those of skill in the art, including but not limited to, the use of a bead mill (Dynomill KDL or Eiger Torrance Minimill, ultrasonicator (Misonix, Farmingdale, N.Y. or VirSonic Ultrasonic, VirTis—an SP Industries Company, Gardiner N.Y. for example), Microfluidizer™, (Microfluidics Corp. Newton, Mass. for example), homogenizer (Gaulin 15 MR-8TA homogenizer from APV Gaulin, Minneapolis, Minn., for example), media mill (MiniCer from Netzsch Incorporated, Exton, Pa. for example), or high shear mixing (Ulta-Turrax mixer from IKA Works, Inc. Wilmington Del., for example).

Dispersions as described herein can generally be mixed, dispersed, or a combination thereof until the desired particle size is obtained. Some dispersions described herein can be mixed for about 10 minutes, about 20 minutes, about 30 minutes, about 45 minutes, about 60 minutes, about 90 minutes, about 150 minutes, about 180 minutes, about 210 minutes, about 240 minutes, or some other amount of time.

According to the present invention, the metal oxide dispersion can be used to manufacture inkjet ink by further comprising one or more components selected from the group consisting of polymerization initiators, antimicrobial agents, antioxidant agents, anti-kogating agents, radical inhibitor, thixotropic agent and other additives known in the art.

"A polymerization initiator" refers to a chemical that can start a polymerization reaction, typically initiating radical formation upon exposure to light or heat. A polymerization initiator can be a photoinitiator or a thermal initiator. A photoinitiator is a chemical that initiates polymerization reaction by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173™, Darocur 2959™, and CIBA IRGACURE 2959. A thermal initiator is a chemical that initiates polymerization reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronite (AIBN).

"An anti-kogating agent" refers to a chemical that can reduce deposits known as "kogation" being formed on the exposed surface of the heater element (resistor element) in thermal ink-jet printers. "Kogation" is commonly defined as the build-up of residue (koga) on the resistor surface.

The radical inhibitor is often used to inhibit polymerization in monomers that polymerize with radical mechanisms, such as acrylates, methacrylates or styrene. According to the present invention, any radical inhibitors may be used. For example, the radical inhibitors include monomethyl ether of hydroquinone (MEHQ), hydroquinone (HQ), 4-hydroxytempo (formally 4-hydroxy-2,2,6,6-tetramethylpiperidin-1-oxyl) [TEMPO], butylated hydroxytoluene (BHT).

More preferably, a lipophilic compound should be used. Most preferably, MEHQ should be used in an added concentration range from 50 to 5000 ppm, with 1500-2500 the more preferred range. In the case where the methacryloxytrimmethoxysilane is used, a polymerizable species is attached to the surface of the pigment and provide extra protection against ink adhesion problems by incorporating into the polymer matrix.

A titanium dioxide dispersion of the invention, a thixotropic additive such as a silica or $SiO_2$ dispersion can be included to prevent inkjet inks smudging during lens fill, cap and curing. The $SiO_2$-based thixotropic additive is incorporated via a $SiO_2$-DPGDA monomer dispersion which is prepared using a high energy bead milling process. When this grind is prepared without any radical inihibitors in the formulation, a higher viscosity, higher particle size material with significantly lower production yields is made. When the radical inhibitor, MEHQ (methoxy hydroquinone) is added to the formulation, dramatic improvements in particle size reduction and processing yield are observed. Further, with this decrease in dispersion viscosity, this technology enhancement has the potential to increase $SiO_2$/DPGDA concentrations and to create the possibility of using less silicon dioxide dispersion in the final ink formulation. This is very useful because it leaves more room for other additives, monomers or pigments required to make an ink. When higher concentration silicon dioxide dispersions are used, it opens up the possibility of preparing more highly pigmented inks which can be used for ink jet printed color cosmetic lenses.

Fumed silica, silicon dioxide and similar products form stiff microscopic chains or fibers which interlock or agglomerate into a mass, holding the associated liquid by surface tension, but which can separate or slide when sufficient force is applied. This causes the thixotropic or shear-thinning property (also frequently exhibited by gels), where the viscosity is non-Newtonian and becomes lower as the shearing force or time increases; their usefulness is primarily that the resulting increase in viscosity is large related to the quantity of silicon dioxide added. Fumed silica is generally accepted as safe as a food additive [21CFR part 172.480] and is frequently used in cosmetics. Additives such as precipitated silica, fine talc, or chalk also meet the definition of thickening agent in that they increase viscosity and body while not affecting the target property of a mixture.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

A pigment nominal (millbase) dispersion was obtained by dissolving 1.05 parts of the dispersant (Disperbyk 111, manufactured by Byk Chemie) in 63.95 parts of millbase (dipropylene glycol diacrylate [DPGDA], available from Sartomer), putting 35.0 parts of the titanium oxide (Kowet or Atlas White, available from Huntsman Tioxide and Sensient, respectively, 2000 parts per million monomethyl ether hydroquinone, Aldrich) stirring and mixing the solution by means of a high-speed mixer for about 30 minutes until it was homogeneous, and then dispersing the resulting mixture in a bead mill using 0.4-1 mm zirconium silicate beads for 1-3 hours.

EXAMPLE 2

A titanium oxide dispersion is obtained in the same manner with the use of a different dispersant (Solsperse 36000, a polycaprolactone-polyacid copolymers manufactured by Lubrizol) from Example 1.

EXAMPLE 3

Titanium oxide dispersion is obtained in the same manner to the example 1 except without use of dispersant.

The examples 1, 2 and 3 were prepared with the same manner but with slightly different amount of DPGDA and different dispersants (if any) as provided in Table 1. For these formulations, composition can further comprise a radical inhibitor. The radical inhibitor is often used to inhibit polymerization in monomers that polymerize with radical mechanisms, such as acrylates, methacrylates or styrene. According to the present invention, any radical inhibitors may be used. For example, the radical inhibitors include monomethyl ether of hydroquinone (MEHQ), hydroquinone (HQ), 4-hydroxytempo (formally 4-hydroxy-2,2,6,6-tetramethylpiperidin-1-oxyl) [TEMPO], butylated hydroxytoluene (BHT). More preferably, a lipophilic compound should be used. Most preferably, MEHQ should be used in an added concentration range from 50 to 5000 ppm, with 1500-2500 the more preferred range.

TABLE 1

Nominal Dispersion Formulations

| Sample ID | TiO$_2$ (mass %) | DPGDA (mass %) | MEHQ radical inhibitor (ppm) | Dispersant/mass % |
|---|---|---|---|---|
| Example 1 | 35 | 63.95 | 2000 | Disperbyk111/1.05% |
| Example 2 | 35 | 64.75 | 2000 | Solsperse 36000/0.25% |
| Example 3 | 35 | 65 | 2000 | None/0% |

BYK-111: Disperbyk-111 is a phosphoric acid polyester copolymer dispersant manufactured by Byk Chemie, with an acid value 129 mg KOH/g.

SP36000: Solsperse 36000 is a polycaprolactone-polyacid dispersant manufactured by Lubrizol, with an acid value 45 mg KOH/g.

The pigment dispersions obtained in Examples 1 to 3 are diluted with DPGDA to a concentration of 5 w/w % and 10 w/w % and were evaluated on the following items: (1) filtration time, (2) viscosity, and (3) dispersibility. The test results are provided in Table 2.

TABLE 2

Diluted Nominal Dispersion Formulations

| | 5 w/w % | | | 10 w/w % | | | No sonication | Sonication level 2 |
|---|---|---|---|---|---|---|---|---|
| Sample ID | 1 um filtration time (s) | 2.7 um filtation time (s) | Viscosity (cps) | 1 um Filtration time (s) | 2.7 um filtration time (s) | Viscosity (cps) | Mean Particle size (um) | Mean Particle size (um) |
| TiO$_2$-5439-27-BYK | 26 | 4 | 10.9 | 27 | 4 | 11.4 | 0.2711 | 0.2873 |
| TiO$_2$-5439-22-Solsperse 36000 | >300 | 7 | 12.1 | >300 | 8 | 14.8 | 1.0772 | 0.6418 |
| 5439-19 (no dispersant) | 111 | 4 | 10.5 | >300 | 7 | 14.9 | 1.1376 | 0.5474 |

To make inks for this process, a thixotropic agent (silicon dioxide) dispersion containing with a small enough particle size and high processing yield must be made to ensure a practical process as illustrated in Table 3.

The following dispersion formulations have been prepared using DPGDA, SiO$_2$ and MEHQ inhibitor (where applicable):

TABLE 3

| Sample ID | SiO$_2$ (mass %) | DPGDA (mass %) | ppm MEHQ | Grind Viscosity (cps) | Grind % yield | Mean particle size (um) |
|---|---|---|---|---|---|---|
| EDD3A-0015-1 | 6.25 | 93.75 | 0 | 773 | 65.41 | 60.72 |
| EDD3A-0015-2 | 6.25 | 93.55 | 2000 | 102 | 90.94 | 0.3474 |

The use of MEHQ as a radical inhibitor decreases the millbase viscosity during processing suggesting partial polymerization of the DPGDA monomer. The ability to grind in a lower viscosity millbase allows more efficient reduction of particle size during processing.

Measuring methods are shown in the following:
(1) Filtration Time
Measure filtration time of the sample (filtration time 2.7) using 15 ml of a 2.7 um Whatman glass fiber microfilter (25 mm disc filter paper). Using a suitable suction filtration flask connected to a vacuum pump with a calibrated in-line differential pressure gauge, filter 15 ml of the fluid and record the time required for full filtration with a calibrated stopwatch. Be sure the differential pressure gauge reads between 500 and 1000 mbar. This pressure reading should be taken directly after the timed filtration.

Measure filtration time of the sample (filtration time 1.0) using a 1.0 um Whatman glass fiber microfilter (25 mm disc filter paper). Using a suitable suction filtration flask connected to a vacuum pump with a calibrated in-line differ-
ential pressure gauge, filter 10 ml of the fluid recovered in the previous filtration step and record the time required for full filtration with a calibrated stopwatch. Be sure the differential pressure gauge reads between 500 and 1000 mbar. This pressure reading should be taken directly after the timed filtration.

Filtration time is a macroscopic measure of an ink jet fluid. The dispersion is diluted to its approximate concentration in the final ink and the time required to pass through filtration media with a certain average pore size is measured. A fast filtration time through a given pore distribution means that a very large fraction of particles have diameter less than that average dimension (i.e. 2.7 or 1.0 um). In a typical experiment, the starting differential pressure is ~50 mbar. This increases to 500-1000 mbar during 1 um filtration and more typically will fall between 800 and 950 mbar. Filtration time may also be affected by the viscosity of the ink or dispersion since percolation through the pores is affected by this parameter as well. Therefore, this is a good measurement simulating the potential shear and pumping through a (larger orifice i.e. 50 um) ink jet nozzle and is a good predictor or performance reliability. While particle size is an important measurement, for example, it is done on a very dilute mixture of the ink and does not account for the macroscopic properties of the actual ink. Filtration time (in conjunction with viscosity and surface tension) gives us a better idea of how the fluid will perform in an ink jet nozzle. For a 10% solids dispersion, a 1 um filtration time range of <60 s is desired. More preferably, a filtration time of <30 s is desired.

2) Viscosity: Measure this at 25° C. on a Brookfield viscometer using the appropriate shear rate (16-80 s$^{-1}$)

Viscosity is a measure of shear strain upon application of stress. While an ink passes through a jet nozzle, the applied electric field will help separate the fluid into droplets (i.e. jetting), but only if the viscosity falls within a certain range (i.e. 10-60 cps). At viscosities above this range, formation of discrete droplets will be difficult due to high resistance of the fluid to applied shear; below this range it is also difficult with the potential for "dripping" out of the nozzle.

For the 10 wt % dilute dispersion, a viscosity <12 cps is preferred. Lower viscosities are typically indicative of control of agglomeration, which can affect viscosity at higher % solids concentrations.

3) Dispersibility: according to this invention, dispersibility is measured by the difference of mean Particle size between unsonicated and sonicated samples. Sonication is used as a tool to break up particle agglomerates. The Horiba will circulate the dispersion through the cell, measure without sonication, and then go through a ladder in which the sonication energy level is ramped up. At higher sonic energy inputs, the electrostatic interactions between smaller agglomerated particles are overcome and measurement of free particles is possible. The difference between particle sizes measured with and without this sonic energy input tells us how well the smaller particles are stabilized. If they are not well stabilized, this difference is larger (e.g. mean goes from 1.5 um unsonicated to 0.5 um with sonication). If there is good stabilization, this difference is very small (e.g. $TiO_2$-BYK above: unsonicated mean ~0.2711, sonicated is ~0.2873 um).

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

What is claimed is:

1. A metal oxide dispersion composition comprising a metal oxide, a dispersant, a radical inhibitor, a thixotropic agent and a millbase, wherein the dispersant is selected from a group consisting of a phosphoric acid polyester copolymer, a trimethoxysilanes compound, a triethoxysilanes compound, dimethylamino ethyl methacrylate (DMAEMA) and a combination thereof, wherein the radical inhibitor is selected from the group consisting of monomethyl ether of hydroquinone (MEHQ), hydroquinone (HQ), 4-hydroxytempo, formally 4-hydroxy-2,2,6,6-tetramethylpiperidin-1-oxyl (TEMPO), and butylated hydroxytoluene (BHT), wherein the thixotropic agent is silicon dioxide dispersion, wherein the dispersion is free of water, and wherein the metal oxide dispersion is used for making inkjet color ink for contact lens.

2. The metal oxide dispersion composition of claim 1, wherein the radical inhibitor is monomethyl ether of hydroquinone (MEHQ).

3. The metal oxide dispersion composition of claim 1, wherein the metal oxide has an average diameter that is not greater than 60 nanometers.

4. The metal oxide dispersion composition of claim 3, wherein the metal oxide has an average diameter that is not greater than 50 nanometers.

5. The metal oxide dispersion composition of claim 1, wherein the millbase is selected from a group consisting of a difunctional acrylate monomer, a monofunctional acrylate and a combination thereof.

6. The metal oxide dispersion composition of claim 5, wherein the millbase is a difunctional acrylate monomer.

7. The metal oxide dispersion composition of claim 1, wherein the metal oxide is a titanium dioxide.

8. The metal oxide dispersion composition of claim 7, wherein the dispersant is a phosphoric acid polyester copolymer.

9. The metal oxide dispersion composition of claim 1, wherein the metal oxide is selected from a group consisting of iron(II) oxide (FeO), iron(II,III) oxide ($Fe_3O_4$), iron(III) oxide ($Fe_2O_3$), oxyhydroxides and a combination thereof.

10. The metal oxide dispersion composition of claim 9, the dispersant is selected from a group consisting of a trimethoxysilane compound, a triethoxysilanes compound and a combination thereof.

11. The metal oxide dispersion composition of claim 1, wherein the silicon dioxide dispersion comprising a radical inhibitor selected from the group consisting of monomethyl ether of hydroquinone (MEHQ), hydroquinone (HQ), 4-hydroxytempo, formally 4-hydroxy-2,2,6,6-tetramethylpiperidin-1-oxyl (TEMPO), butylated hydroxytoluene (BHT).

12. The metal oxide dispersion composition of claim 11, wherein the radical inhibitor in silicon dioxide dispersion is monomethyl ether of hydroquinone (MEHQ).

* * * * *